(No Model.)
H. & J. KNUPP.
THILL COUPLING.
No. 373,590. Patented Nov. 22, 1887.
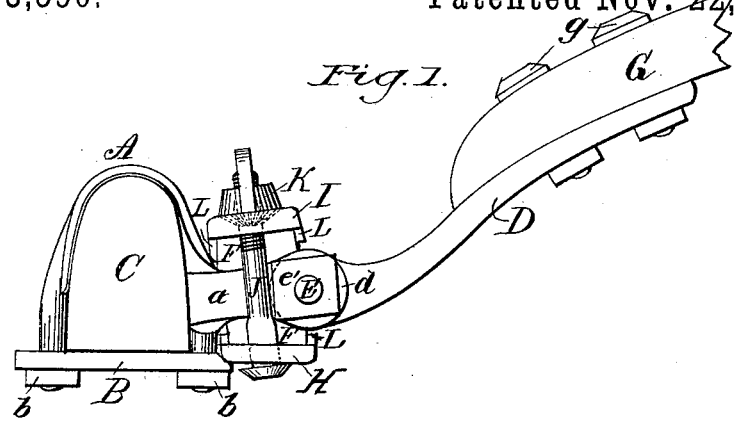
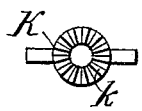
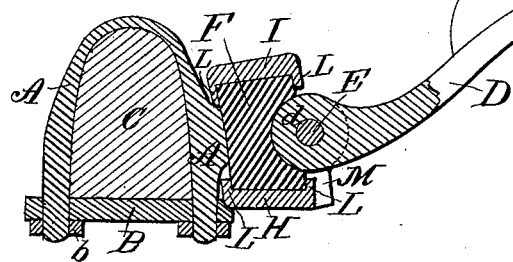
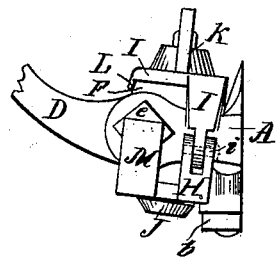
WITNESSES:
John A. Ellis.
C. Sedgwick
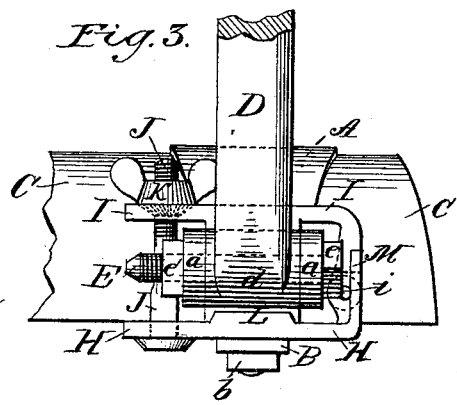
INVENTOR:
H. Knupp
J. Knupp
BY Munn & Co
ATTORNEYS.

UNITED STATES PATENT OFFICE.

HENRY KNUPP AND JOHN KNUPP, OF WARREN, PENNSYLVANIA.

THILL-COUPLING.

SPECIFICATION forming part of Letters Patent No. 373,590, dated November 22, 1887.

Application filed August 12, 1887. Serial No. 246,779. (No model.)

*To all whom it may concern:*

Be it known that we, HENRY KNUPP and JOHN KNUPP, of Warren, in the county of Warren and State of Pennsylvania, have invented a new and Improved Thill-Coupling, of which the following is a full, clear, and exact description.

Our invention relates to a coupling for connecting thills to the axle of a vehicle, and has for its object to provide a simple, inexpensive, and effective device of this character which will prevent rattling of the thill-iron at its pivot, and prevent loss of the pivot, and promote the durability of the entire thill-coupling.

The invention consists in certain novel features of construction and combinations of parts of the thill-coupling, all as hereinafter fully described and claimed.

Reference is to be had to the accompanying drawings, forming a part of this specification, in which similar letters of reference indicate corresponding parts in all the figures.

Figure 1 is a side elevation of our improved thill-coupling as applied to use. Fig. 2 is a sectional side view of the same. Fig. 3 is a front view. Fig. 4 is a detail view taken at the opposite side from that seen in Fig. 1, or at the hinged end of the clamp. Fig. 5 is a detail view of the clamp-screw nut, and Fig. 6 is a detail view of part of one of the clamp-arms against which the nut acts.

The thill-coupling is formed with the usual clip, A, having bolt ends receiving nuts $b$ $b$, which hold the clip by its bottom plate, B, securely to a vehicle-axle, C. The clip A is provided at the front with a pair of lugs, $a$ $a$, between which is fitted the eye $d$ of the thill-iron D, and a bolt, E, passing through the parts $a$ $a$ $d$, pivots the thill-iron to the clip and consequently to the axle. Between the thill-iron eye and the outer side or face of the body of the clip A a rubber block, F, forming an anti-rattler, is placed. This block F may be made of leather or any other suitable material. The thill-iron is held by bolts $g$ to the thill G, the back end only of which is shown in the drawings.

All of the above-named parts may have any usual or approved construction.

To hold the anti-rattler F securely to place and expand it laterally or horizontally by vertical pressure to positively prevent rattling of the thill-iron on its pivot E, we employ a clamp consisting of a lower plate, H, an upper plate, I, hinged together by a pin, $i$, which passes through vertically-bent end portions of the clamp-plates, and a headed screw, J, which is passed upward through and fits a square hole in the unhinged end of the lower plate, H, and passes also through a round hole at the adjacent end of the upper plate, I, and above the latter plate the screw J receives a thumb-nut, K, by turning which the plates H I may be drawn toward each other at their free or unhinged ends to compress the anti-rattler vertically, and thereby expand it between the clip A and the thill-iron eye $d$ to prevent rattling of the thill-iron. The opposite clamp-plates are each provided with lips L at each side, which lap on the top and bottom parts of the anti-rattler and prevent its breaking or working out, and assure its expansion under pressure of the clamp only at a point directly between the clip and the thill-iron eye, thus promoting the efficiency and durability of the anti-rattler and the entire coupling and allowing the anti-rattler to be easily put in place quite loosely before the clamp is applied. Where the thumb-nut K acts on the clamp-plate I said plate is countersunk around the screw-hole, and the nut is correspondingly convexed, and the opposing faces of both the clamp-plate and the nut are provided with a series of radial serrations or teeth, $k$, not deep enough to prevent turning of the nut on the plate while the anti-rattler is being compressed by the screw, but sufficiently deep to prevent turning back or loosening of the nut by the resistance or expanding pressure of the anti-rattler on the clamp-plates. One of the clamp-plates, preferably the lower one, H, is provided with a lug, M, which stands immediately outside of the head $e$ of the pivot-bolt E, which holds the thill-iron and would prevent slipping out or loss of the pivot-bolt should no nut be used on the bolt; but we prefer to use such a nut, $e'$, and when it is screwed up to the clip-lug $a$ the clamp-screw J is passed closely alongside of the nut $e'$ to prevent its turning back off of the pivot-bolt. A double safeguard is thus provided to prevent loss of the pivot E.

It will be noticed that all parts of the anti-rattler clamp are easily made, and the whole device is not only quite inexpensive, but very efficient for its purpose.

Having thus fully described our invention, what we claim as new, and desire to secure by Letters Patent, is—

1. The combination, with a pivoted thill-iron and an elastic or compressible anti-rattler, F, placed next the thill-iron eye, substantially as specified, of a clamp comprising opposite plates, H I, hinged together at $i$ and bearing on the part F, a screw, J, passed through the parts H I, and a nut, K, on said screw, substantially as described, for the purposes set forth.

2. The combination, with a pivoted thill-iron and an anti-rattler, F, placed next the thill-iron eye, substantially as specified, of a clamp comprising opposite connected plates, H I, a screw, J, passed therethrough, and a nut, K, on the screw, and the opposing faces of the parts H K being serrated at $k$, substantially as described, for the purposes set forth.

3. The combination, with a pivoted thill-iron and an anti-rattler, F, placed next the thill-iron eye, substantially as specified, of a clamp comprising opposite plates clasping the anti-rattler, and one of said clamp-plates provided with a lug, M, overlying the head $e$ of the thill-iron pivot E, substantially as described, for the purposes set forth.

4. The combination, with a pivoted thill-iron and an anti-rattler, F, placed next the thill-iron eye, substantially as specified, of a clamp comprising opposite plates connected at one end and clasping the anti-rattler, and a screw and nut at the opposite ends of the clamp-plates, and said clamp-screw passed alongside the nut $e'$ of the thill-pivot E, substantially as described, for the purpose set forth.

HENRY KNUPP.
JOHN KNUPP.

Witnesses:
L. P. ROYERS,
JAMES CABLE.